(12) United States Patent
Ito et al.

(10) Patent No.: US 12,504,340 B2
(45) Date of Patent: Dec. 23, 2025

(54) PRESSURE DETECTION DEVICE AND MANUFACTURING METHOD

(71) Applicant: FUJI ELECTRIC CO., LTD., Kanagawa (JP)

(72) Inventors: Yuichi Ito, Matsumoto (JP); Mutsuo Nishikawa, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 413 days.

(21) Appl. No.: 18/323,392

(22) Filed: May 24, 2023

(65) Prior Publication Data

US 2024/0011856 A1 Jan. 11, 2024

(30) Foreign Application Priority Data

Jul. 8, 2022 (JP) .................................. 2022-110790

(51) Int. Cl.
*G01L 9/00* (2006.01)
*H10N 30/04* (2023.01)

(52) U.S. Cl.
CPC .......... *G01L 9/0054* (2013.01); *H10N 30/04* (2023.02); *G01L 2009/0066* (2013.01)

(58) Field of Classification Search
CPC .......... G01L 9/0054; G01L 2009/0066; G01L 9/0042; G01L 9/04; H10N 30/04; H10D 48/50; H10D 62/60
See application file for complete search history.

(56) References Cited

U.S. PATENT DOCUMENTS

| | | | |
|---|---|---|---|
| 5,525,549 A | 6/1996 | Fukada | |
| 6,218,717 B1* | 4/2001 | Toyoda | G01L 9/0054 |
| | | | 257/419 |
| 6,255,678 B1* | 7/2001 | Sawada | G01K 1/02 |
| | | | 257/253 |
| 9,618,475 B2* | 4/2017 | Rothberg | C12Q 1/6874 |
| 10,031,101 B2* | 7/2018 | Saitoh | G01N 27/4145 |
| 11,339,430 B2* | 5/2022 | Rothberg | H01L 24/82 |
| 2018/0217624 A1 | 8/2018 | Shiine | |
| 2019/0285495 A1 | 9/2019 | Yoneda | |
| 2020/0240857 A1 | 7/2020 | Kudo | |

FOREIGN PATENT DOCUMENTS

| | | | | |
|---|---|---|---|---|
| CN | 105321988 B | * | 10/2018 | |
| EP | 0890998 A1 | * | 1/1999 | .......... G01L 9/0054 |
| JP | 2018125588 A | | 8/2018 | |
| JP | 2019158576 A | | 9/2019 | |
| JP | 2020122713 A | | 8/2020 | |

* cited by examiner

*Primary Examiner* — Francis C Gray

(57) ABSTRACT

Provided is a pressure detection device including: a semiconductor substrate having an upper surface; a bulk region of a first conductivity type provided in the semiconductor substrate; a piezo-resistive region of the first conductivity type provided between the bulk region and the upper surface of the semiconductor substrate; a first well region of a second conductivity type provided between the piezo-resistive region and the bulk region; and a first low-concentration region of the second conductivity type provided between the first well region and the bulk region and having a lower concentration than the first well region.

20 Claims, 9 Drawing Sheets

PRESSURE DETECTION DEVICE AND MANUFACTURING METHOD

The contents of the following Japanese patent application(s) are incorporated herein by reference:
NO. 2022-110790 filed in JP on Jul. 8, 2022

BACKGROUND

Technical Field

The present invention relates to a pressure detection device and a manufacturing method.

A pressure detection device is known in which a diaphragm formed on a silicon substrate or the like is provided with a piezo-resistance (see, for example, Patent Documents 1 and 2).

CITATION LIST

Patent Document

Patent Document 1: Japanese Patent Application Publication No. 2018-125588
Patent Document 2: Japanese Patent Application Publication No. 2019-158576

DESCRIPTION OF EXEMPLARY EMBODIMENTS

Figure 1:
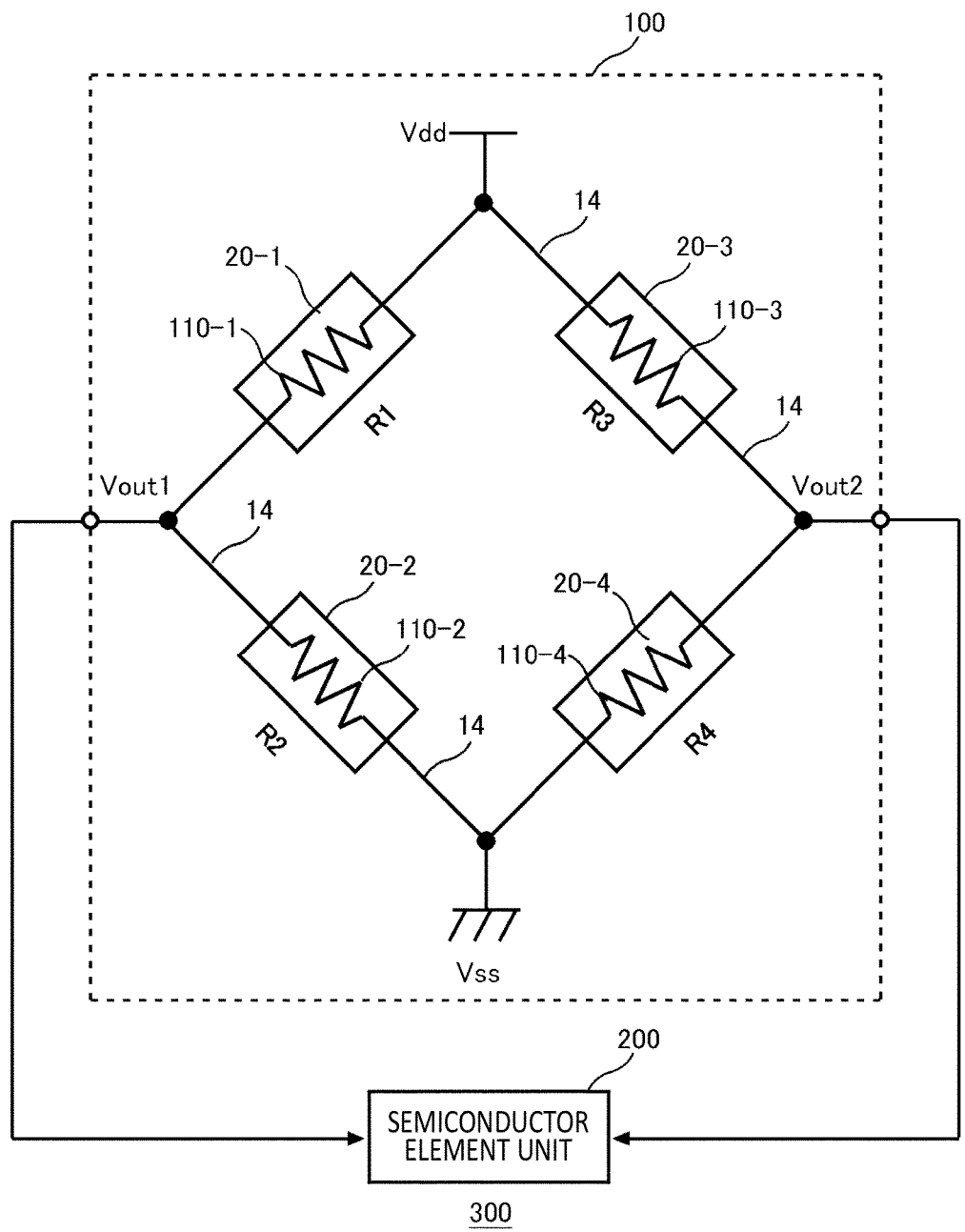
FIG. 1 is a diagram illustrating an example of a circuit configuration of a pressure detection device 300 according to an embodiment of the present invention.

Hereinafter, the present invention will be described through embodiments of the invention, but the following embodiments do not limit the invention according to the claims. In addition, not all combinations of features described in the embodiment are essential to the solution of the invention.

As used in the present specification, one side in a direction parallel to a depth direction of a semiconductor substrate is referred to as "upper" and the other side is referred to as "lower". One surface of two principal surfaces of a substrate, a layer, or other members is referred to as an upper surface, and the other surface is referred to as a lower surface. "Upper" and "lower" directions are not limited to a direction of gravity, or a direction in which a device is mounted.

In the present specification, orthogonal axes parallel to the upper surface and the lower surface of the semiconductor substrate are referred to as the X axis and the Y axis. In addition, the axis perpendicular to the upper surface and the lower surface of the semiconductor substrate is referred to as the Z axis. As used herein, a direction of the Z axis may be referred to as a depth direction. In addition, as used in the present specification, a direction parallel to the upper surface and the lower surface of the semiconductor substrate, including the X axis and the Y axis, may be referred to as a horizontal direction.

A region from the center of the semiconductor substrate in the depth direction to the upper surface of the semiconductor substrate may be referred to as an upper surface side. Similarly, a region from the center of the semiconductor substrate in the depth direction to the lower surface of the semiconductor substrate may be referred to as a lower surface side.

As used herein, phrases such as "same" or "equal" may be used even when there is an error caused due to a variation in a manufacturing step or the like. This error is within a range of 10% or less, for example.

In the present specification, a net doping concentration means a net concentration obtained by adding the donor concentration set as a positive ion concentration to the acceptor concentration set as a negative ion concentration, taking polarities of charges into account. As an example, when the donor concentration is referred to as $N_D$ and the acceptor concentration is referred to as $N_A$, the net doping concentration at any position is given as $N_D$-$N_A$. In the present specification, unless otherwise specified, the net doping concentration is simply described as a doping concentration. The net doping concentration can be measured by the capacitance-voltage method (CV method). Further, a carrier density measured by a spreading resistance method (SR method) may be set as the net doping concentration. The carrier density measured by the CV method or the SR method may be set as a value in a thermal equilibrium state. Each concentration in the present specification may be a value at room temperature. As the value at room temperature, a value at 300 K (Kelvin) (about 26.9° C.) may be used as an example.

A p+ type or an n+ type described in the present specification means a doping concentration higher than that of the p type or the n type, and a p-type or an n-type described herein means a doping concentration lower than that of the p type or the n type. In the specification, a unit system is the SI base unit system unless otherwise particularly noted. In addition, the p type and the n type correspond to a first conductivity type and a second conductivity type. The p type and n type in each example may be replaced with conductivity types opposite to each other.

When charged particles such as ions or electrons are implanted into the semiconductor substrate with predetermined acceleration energy, these particles have a predetermined distribution in the depth direction. In the present specification, a position of a peak of the distribution may be referred to as a particle implantation position or implantation depth or the like.

FIG. 1 is a diagram illustrating an example of a circuit configuration of a pressure detection device 300 according to an embodiment of the present invention. The pressure detection device 300 includes a pressure detection unit 100 and a semiconductor element unit 200. The pressure detection unit 100 includes a plurality of piezo-resistive portions 110. The pressure detection unit 100 may further include a plurality of shield films 20. In the example of FIG. 1, the pressure detection device 300 includes a plurality of piezo-resistive portions 110-1, 110-2, 110-3, and 110-4 (hereinafter, may be collectively referred to as the plurality of piezo-resistive portions 110) constituting a Wheatstone bridge circuit. The resistance value of each piezo-resistive portion 110-$k$ is referred to as Rk. In addition, each piezo-resistive portion 110-$k$ is provided with a shield film 20-$k$.

As an example, the piezo-resistive portion 110 is a diffusion resistor formed on the semiconductor substrate. The semiconductor substrate may be a silicon substrate, or may be a compound semiconductor substrate of silicon carbide (SiC) or the like. The piezo-resistive portion 110 may be formed by selectively doping p-type or n-type dopants into the semiconductor substrate and also performing a thermal diffusion. The piezo-resistive portion 110 of this example is formed on a diaphragm disposed on the semiconductor substrate.

The piezo-resistive portion 110-1 is electrically connected between a high potential-side terminal Vdd of the Wheatstone bridge circuit and a first intermediate potential terminal Vout1 of the Wheatstone bridge circuit. The piezo-resistive portion 110-2 is electrically connected between the first intermediate potential terminal Vout1 and a low potential-side terminal Vss of the Wheatstone bridge circuit. The piezo-resistive portion 110-3 is electrically connected between the high potential-side terminal Vdd and a second intermediate potential terminal Vout2 of the Wheatstone bridge circuit. The piezo-resistive portion 110-4 is electrically connected between the second intermediate potential terminal Vout2 and the low potential-side terminal Vss. The piezo-resistive portions 110 are connected to each other by a wiring 14. The piezo-resistive portion 110 and each terminal are also connected by the wiring 14.

When a pressure around the pressure detection device 300 changes, the diaphragm of the semiconductor substrate is deformed, and the resistance value of each piezo-resistive portion 110 fluctuates. As a result, the potentials at the first intermediate potential terminal Vout1 and the second intermediate potential terminal Vout2 change. The pressure around the pressure detection device 300 can be calculated from the potential. The semiconductor element unit 200 processes a signal corresponding to the potentials of the first intermediate potential terminal Vout1 and the second intermediate potential terminal Vout2. The semiconductor element unit 200 may have at least one of a function of amplifying the signal, a function of removing noise, a function of converting the signal into a digital signal, and a function of processing the digital signal. The semiconductor element unit 200 of this example includes a semiconductor element such as a MOS transistor.

In a case where the piezo-resistive portion 110 is a diffusion resistor, when a member above the piezo-resistive portion 110 is charged, drift of carriers occurs in the diffusion layer of the piezo-resistive portion 110. In this case, the carrier distribution in the piezo-resistive portion 110 may fluctuate, and the resistance value of the piezo-resistive portion 110 may fluctuate. On the other hand, the shield film 20 is provided so that the fluctuation of the resistance value of the piezo-resistive portion 110 can be suppressed.

The shield films 20 are provided above respective ones of the plurality of piezo-resistive portions 110. The shield film 20 is configured of a conductive material such as polysilicon or metal. Each shield film 20 is connected to a predetermined potential such as a ground potential. As a result, charging in a member above the piezo-resistive portion 110 is suppressed, and a fluctuation in the resistance value of the piezo-resistance is suppressed.

Figure 2:
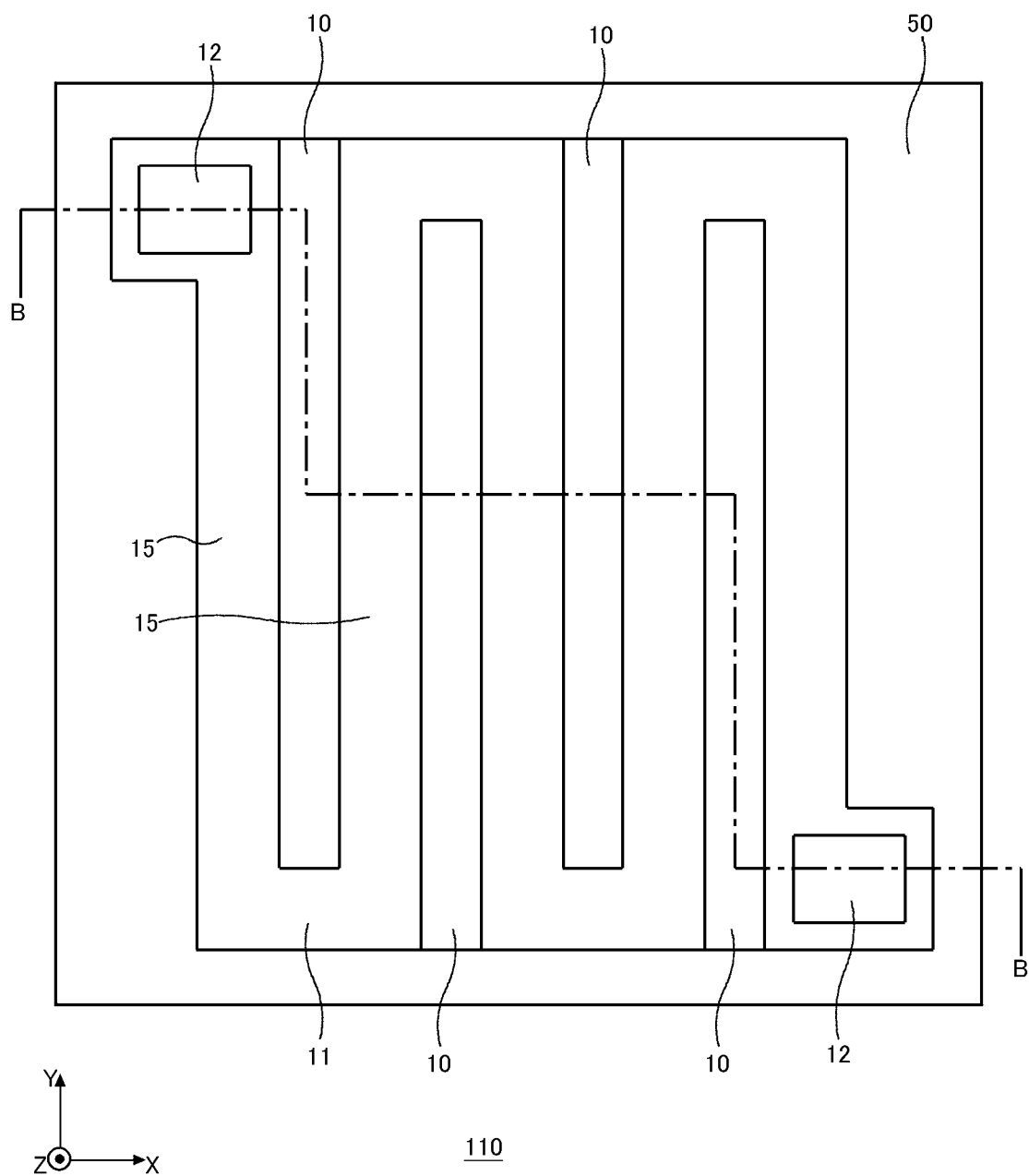
FIG. 2 is a diagram illustrating a structure example of one piezo-resistive portion 110 on an upper surface of a semiconductor substrate 50.

FIG. 2 is a diagram illustrating a structure example of one piezo-resistive portion 110 on an upper surface of a semiconductor substrate 50. In this example, two orthogonal axes on the upper surface of the semiconductor substrate 50 are referred to as an X axis and a Y axis, and an axis perpendicular to the upper surface of the semiconductor substrate 50 is referred to as a Z axis.

The piezo-resistive portion 110 of this example is provided inside the semiconductor substrate 50 and has a p-type piezo-resistive region 11 exposed on the upper surface of the semiconductor substrate 50. The piezo-resistive region 11 is provided to extend in a predetermined direction on the upper surface of the semiconductor substrate 50. In the example of FIG. 2, the piezo-resistive region 11 has a shape of meandering in the XY plane, but the piezo-resistive region 11 may have another shape. The piezo-resistive region 11 of this example has a plurality of extending portions 15 extending in a Y axis direction. The plurality of extending portions 15 are disposed at predetermined intervals along an X axis direction. Two extending portions 15 adjacent to each other in the X axis direction are connected to each other at end portions in the Y axis direction.

Each of two end portions of the piezo-resistive region 11 is connected to the wiring 14 (see FIG. 1). In a portion of the piezo-resistive region 11 connected to the wiring 14, a p-type high-concentration resistance portion 12 having a higher concentration than other portions of the piezo-resistive region 11 may be provided. As a result, a contact resistance between the piezo-resistive region 11 and the wiring 14 can be reduced.

In this example, an n-type separation region 10 having a high concentration is provided between two extending portions 15 adjacent to each other in the X axis direction. A high voltage such as a power supply voltage Vdd (see FIG. 1) is applied to the separation region 10. In FIG. 2, a structure of a wiring or the like for applying the power supply voltage Vdd to the separation region 10 is omitted. When a member above the piezo-resistive region 11 is charged, carriers may be attracted to the surface layer of the n-type region between the two extending portions 15, and the region may be inverted to the p type. When a p-type inversion layer is formed, the two extending portions 15 are connected by the inversion layer and operate as a parasitic p-type MOS transistor. As in this example, the separation region 10 having a high concentration is provided so that it is possible to suppress formation of the p-type inversion layer between the two extending portions 15.

Figure 3:
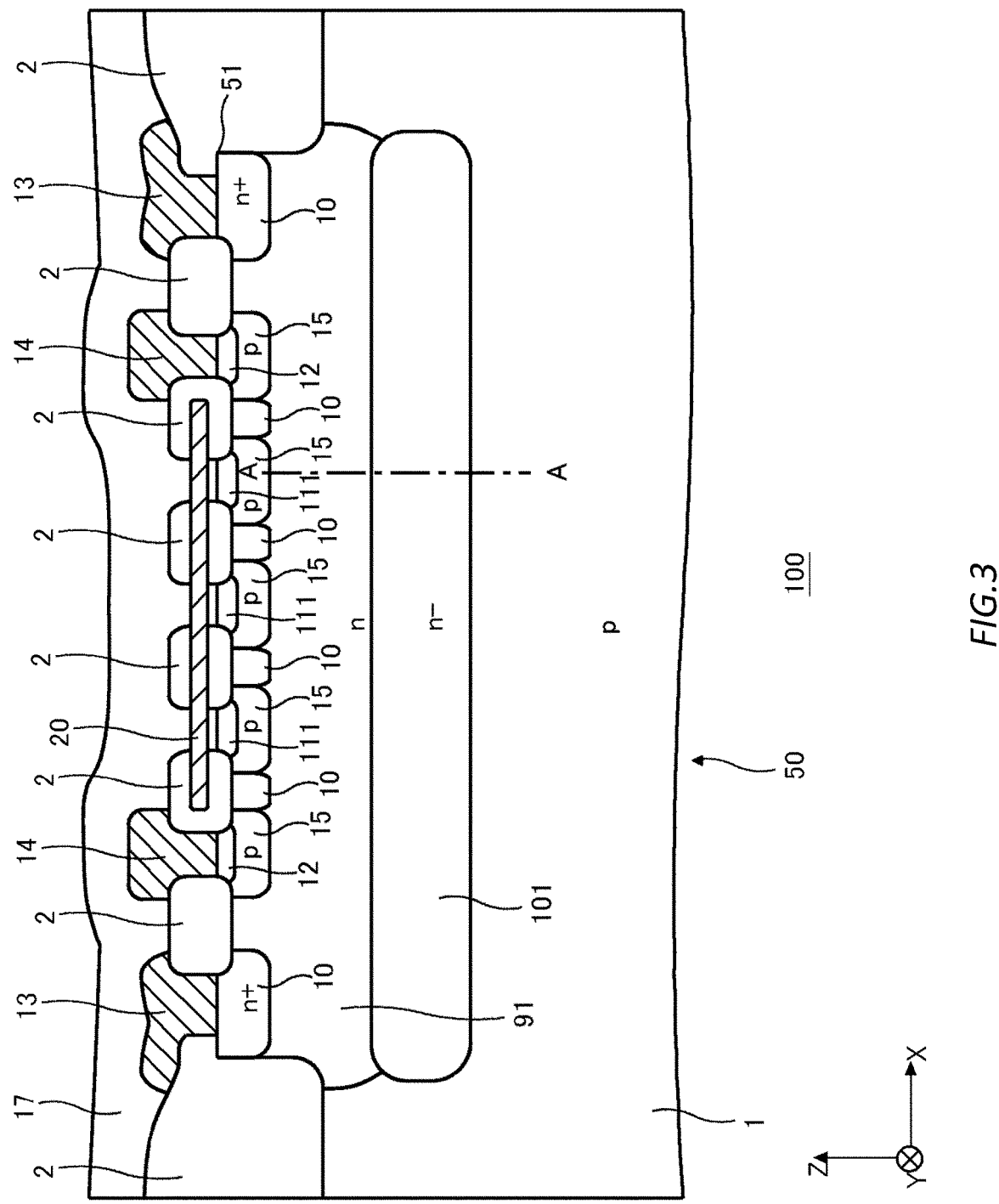
FIG. 3 is a diagram illustrating a structure example of a pressure detection unit 100.

FIG. 3 is a diagram illustrating a structure example of the pressure detection unit 100. FIG. 3 illustrates a cross section of the semiconductor substrate 50 in the vicinity of one piezo-resistive portion 110. The cross section in FIG. 3 corresponds to the B-B cross section in FIG. 2. In FIG. 2, a power supply wiring 13 and the n-type separation region 10 illustrated in FIG. 3 are omitted. The power supply wiring 13 is a wiring that transmits a predetermined power supply voltage Vdd, and is connected to an upper surface 51 of the semiconductor substrate 50. The power supply wiring 13 is formed of a conductive material such as metal. The separation region 10 has a portion connected to the power supply wiring 13 on the upper surface 51 of the semiconductor substrate 50. As a result, a power supply voltage is applied to the separation region 10 provided on the upper surface 51 of the semiconductor substrate 50. By applying a relatively high voltage to the separation region 10, it is possible to suppress the separation region 10 from being inverted to the p type.

The semiconductor substrate 50 has an upper surface 51 and a lower surface. The upper surface 51 and the lower surface are two principal surfaces of the semiconductor substrate 50. In FIG. 3, the lower surface of the semiconductor substrate 50 is omitted.

The semiconductor substrate 50 has a p-type bulk region 1. The bulk region 1 is a region in which p-type dopants are uniformly distributed. The bulk region 1 may be a region other than the locally ion-implanted region in the semiconductor substrate 50.

The wiring 14 is formed on the upper surface 51 of semiconductor substrate 50. The wiring 14 is formed of a conductive material such as metal.

The semiconductor substrate 50 is provided with the p-type piezo-resistive region 11. FIG. 3 illustrates the extending portion 15 of the piezo-resistive region 11. The piezo-resistive region 11 is provided between the bulk region 1 and the upper surface 51 of the semiconductor substrate 50. The piezo-resistive region 11 may or may not be exposed on the upper surface 51.

The doping concentration of the piezo-resistive region 11 may be higher than the doping concentration of the bulk region 1. As described in FIG. 2, both ends of the piezo-resistive region 11 are connected to the wiring 14. The piezo-resistive region 11 may have the high-concentration resistance portion 12 connected to the wiring 14. The high-concentration resistance portion 12 is a p-type region having a higher concentration than other portions of the piezo-resistive region 11.

As described in FIG. 2, the plurality of extending portions 15 of the piezo-resistive region 11 may be provided along the X axis direction in an XZ cross section. The n-type separation region 10 is provided between two extending portions 15 adjacent to each other in the X axis direction. The separation region 10 may have a higher concentration than a first well region 91 described later. The separation region 10 may be in contact with two extending portions 15 adjacent to each other in the X axis direction. The separation region 10 may be exposed on the upper surface 51 of the semiconductor substrate 50. The separation region 10 may be formed deeper than the extending portion 15, may be formed to the same depth as the extending portion 15, or may be formed shallower than the extending portion 15.

The semiconductor substrate 50 is provided with an n-type first well region 91 and an n-type of first low-concentration region 101. The first well region 91 is provided between the piezo-resistive region 11 and the bulk region 1. The piezo-resistive region 11 of this example is disposed inside the first well region 91. The separation region 10 may be provided inside the first well region 91. Each region provided inside the first well region 91 is separated from the bulk region 1 by the first well region 91.

The first low-concentration region 101 is provided between the bottom of the first well region 91 and the bulk region 1. The first low-concentration region 101 is an n-type region having a lower concentration than the first well region 91. That is, the maximum value of the doping concentration in the first low-concentration region 101 is lower than the maximum value of the doping concentration in the first well region 91. The minimum value of the doping concentration in the first low-concentration region 101 may be lower or higher than the maximum value of the doping concentration in the first well region 91. The upper end of the first low-concentration region 101 of this example is in contact with the first well region 91, and the lower end is in contact with the bulk region 1. A pn junction is formed at an interface between the first low-concentration region 101 and the bulk region 1.

When the first low-concentration region 101 is not provided, the first well region 91 having a high concentration and the bulk region 1 are in contact with each other, and an impurity concentration in a pn junction portion increases. In this case, a leakage current between the first well region 91 and the bulk region 1 increases. An increase in the leakage current is particularly remarkable at high temperatures. When the leakage current between the first well region 91 and the bulk region 1 increases, the operation of the pressure detection device 300 may be affected. For example, when the leakage current flowing through the first well region 91 increases or decreases, the potential of the first well region 91 fluctuates. When the potential of the first well region 91 fluctuates, the carrier concentration distribution of the piezo-resistive region 11 may fluctuate, and the resistance value may fluctuate. In the technique disclosed in Patent Document 1, a circuit that compensates for the leakage current is provided, but the circuit scale increases.

On the other hand, by providing the first low-concentration region 101, the first low-concentration region 101 and the bulk region 1 are in contact with each other, and the impurity concentration in the pn junction portion can be lowered. As a result, a leakage current between the first low-concentration region 101 and the bulk region 1 can be suppressed, and the pressure detection device 300 can be operated with high accuracy.

The piezo-resistive region 11 of this example includes the high-concentration resistance portion 12 in contact with the upper surface 51 of the semiconductor substrate 50 and a p-type low-concentration resistance portion having a lower concentration than the high-concentration resistance portion 12. In this example, the portion of the piezo-resistive region 11 disposed between the high-concentration resistance portion 12 and the first well region 91 corresponds to the low-concentration resistance portion. With such a configuration, a leakage current at the pn junction portion between the first well region 91 and the piezo-resistive region 11 can be reduced. Therefore, the pressure detection device 300 can be operated with high accuracy.

A dielectric film 2 may be provided above the upper surface 51 of the semiconductor substrate 50. As an example, the dielectric film 2 is a film formed by oxidizing or nitriding the upper surface 51 of the semiconductor substrate 50. The dielectric film 2 may be a LOCOS film. The wiring 14 and the power supply wiring 13 are connected to the semiconductor substrate 50 via an opening provided in the dielectric film 2.

A protective film 17 may be provided above the upper surface 51 of the semiconductor substrate 50. As an example, the protective film 17 is a film deposited on the upper surface 51 of the semiconductor substrate 50. The protective film 17 is formed of an insulating material such as polyimide. The protective film 17 is provided to cover each member provided on the upper surface 51 of the semiconductor substrate 50.

When the protective film 17 or the dielectric film 2 is charged, carriers may be attracted to the surface layer of the semiconductor substrate 50, and the characteristics of the pressure detection device 300 may change. As described above, when a p-type inversion layer is formed between two extending portions 15, there is a possibility of operating as a parasitic PMOS transistor. In addition, when carriers are attracted to the surface layer of the extending portion 15, there is a possibility that the resistance value of the piezo-resistive region 11 fluctuates. The pressure detection device 300 of this example suppresses charging in the protective film 17 or the dielectric film 2 and suppresses characteristic fluctuation of the pressure detection device 300 even when charging occurs.

A shield film 20 formed of a conductive material such as polysilicon is disposed above the upper surface 51 of the semiconductor substrate 50. A reference potential such as a ground potential is applied to the shield film 20. By providing the shield film 20, charging in the protective film 17, the dielectric film 2, or the like can be suppressed. The shield film 20 covers at least a part of the piezo-resistive region 11 (the extending portion 15 in FIG. 3). The shield film 20 may also cover at least a part of a region between the extending portions 15. The shield film 20 of this example covers the extending portions 15 other than two extending portions 15 at both ends among the plurality of extending portions 15 disposed along the X axis direction. In addition, all of the plurality of separation regions 10 disposed along the X axis direction are covered. The shield film 20 may partially cover two extending portions 15 at both ends in the X axis direction. For example, the shield film 20 may cover at least a part of a region not covered with the wiring 14 in the two extending portions 15. The dielectric film 2 is provided between the shield film 20 and the semiconductor substrate 50. The shield film 20 may be covered with the protective film 17.

By providing the separation region 10, it is possible to suppress a p-type inversion layer from being formed in the region between two extending portions 15. In addition, an n-type region 111 may be provided on the surface layer of each extending portion 15. The n-type region 111 may be an n type having a higher concentration than the first well region 91. By providing the n-type region 111, it is possible to suppress a p-type region having a high concentration from being formed on the surface layer of the extending portion 15 and to suppress the fluctuation of the resistance value of the piezo-resistive region 11.

Figure 4:
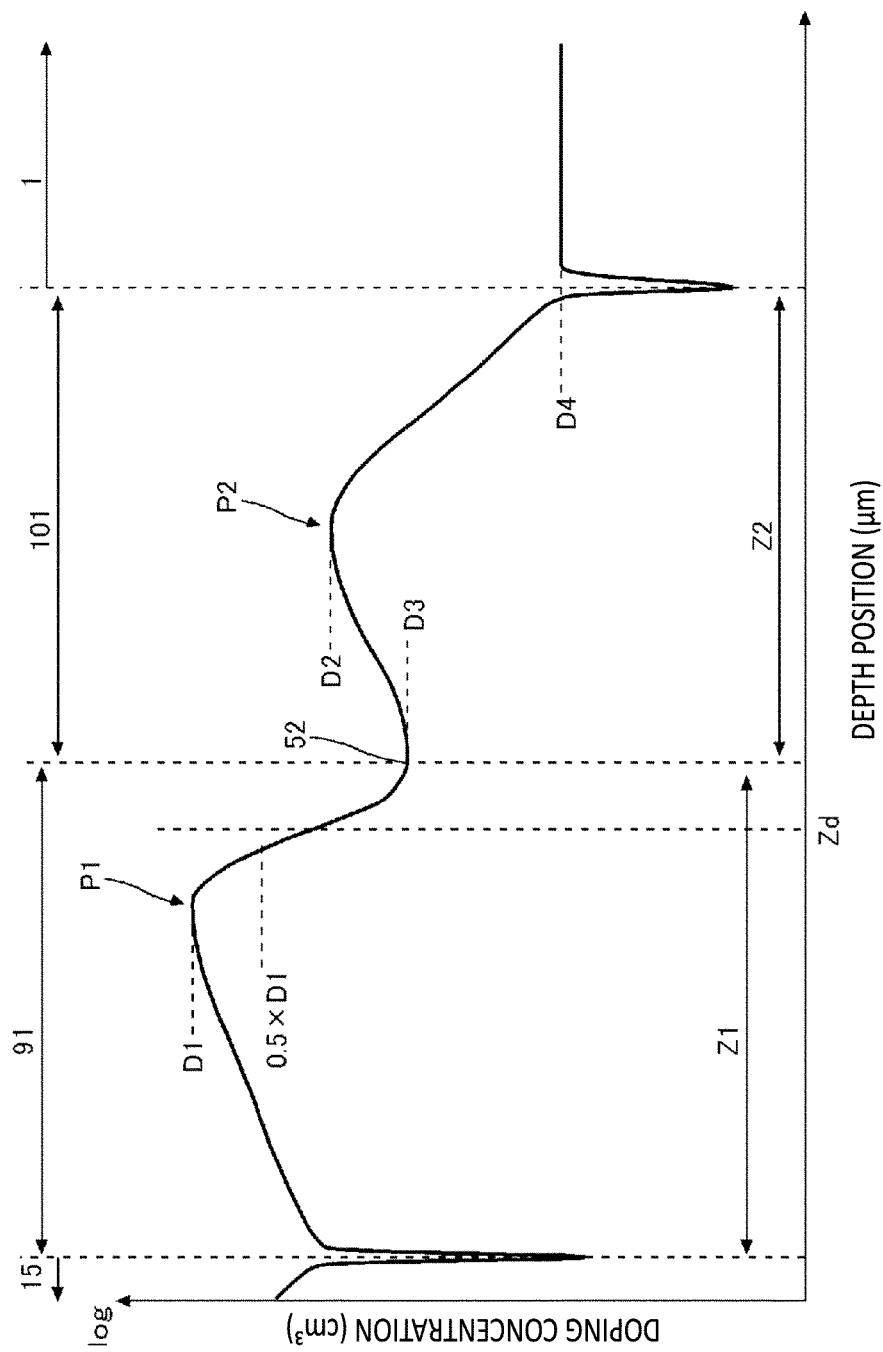
FIG. 4 is a diagram illustrating an example of a doping concentration distribution in a depth direction of the semiconductor substrate 50 taken along line A-A of FIG. 3.

FIG. 4 is a diagram illustrating an example of a doping concentration distribution in the depth direction of the semiconductor substrate 50 taken along line A-A of FIG. 3. The line A-A is parallel to the Z axis and passes through a part of the extending portion 15, the first well region 91, the first low-concentration region 101, and a part of the bulk region 1. A pn junction is formed at a boundary between the extending portion 15 and the first well region 91 and a boundary between the first low-concentration region 101 and the bulk region 1.

The first well region 91 and the first low-concentration region 101 of this example are each formed by implanting ions serving as donors and performing heat treatment. That is, the first well region 91 and the first low-concentration region 101 are formed by implanting ions into two different positions in the depth direction of the semiconductor substrate 50.

The first well region 91 of this example has a concentration peak P1 in the doping concentration distribution in the depth direction. The first low-concentration region 101 has a concentration peak P2 in the doping concentration distribution in the depth direction. The concentration peak is a point at which the doping concentration exhibits a maximum value. The depth position of each concentration peak corresponds to the depth position into which the ion is implanted.

A doping concentration D2 of the concentration peak P2 is lower than a doping concentration D1 of the concentration peak P1. The doping concentration D2 may be half or less, ⅕ or less, 1/10 or less, or 1/100 or less of the doping concentration D1. The doping concentration D1 may be $1 \times 10^{15}/cm^3$ or more and $1 \times 10^{17}/cm^3$ or less. The doping concentration D2 may be $1 \times 10^{13}/cm^3$ or more and $1 \times 10^{15}/cm^3$ or less.

Between the concentration peak P1 and the concentration peak P2, a valley portion 52 in which the doping concentration exhibits a local minimum value is disposed. A region from the lower end of the extending portion 15 (or the piezo-resistive region 11) to the valley portion 52 may be the first well region 91. A region from the valley portion 52 to the bulk region 1 may be the first low-concentration region 101. When a plurality of valley portions 52 are present in the doping concentration distribution from the extending portion 15 to the bulk region 1, the valley portion 52 closest to the extending portion 15 may be used as a boundary between the first well region 91 and the first low-concentration region 101. A doping concentration D3 of the valley portion 52 is larger than a doping concentration D4 of the bulk region 1. The doping concentration D3 may be 2 times or more, 5 times or more, or 10 times or more the doping concentration D4.

The length of the first well region 91 in the depth direction is Z1, and the length of the first low-concentration region 101 in the depth direction is Z2. The length Z2 may be half or more, more than 1 time, or 1.5 times or more the length Z1. By forming the first low-concentration region 101 to be long, it is possible to suppress a depletion layer extending from the pn junction between the first low-concentration region 101 and the bulk region 1 from reaching the concentration peak P1 of the first well region 91 during the actual operation of the pressure detection device 300. Therefore, the leakage current can be suppressed.

In a state where the rated power supply voltage Vdd is applied to the semiconductor substrate 50, a depth position at which the upper end of the depletion layer extending from the pn junction between the first low-concentration region 101 and the bulk region 1 reaches is referred to as Zd. The depth position Zd can be calculated from the magnitude of the rated power supply voltage Vdd and the doping concentration distribution. The depth position Zd is positioned below the concentration peak P1 (that is, near the bulk region 1). The doping concentration at the depth position Zd may be less than half ($0.5 \times D1$) of the doping concentration D1. The depth position Zd may be disposed in the first well region 91. In this example, the depth position Zd may be disposed between the concentration peak P1 and the valley portion 52.

Figure 5:
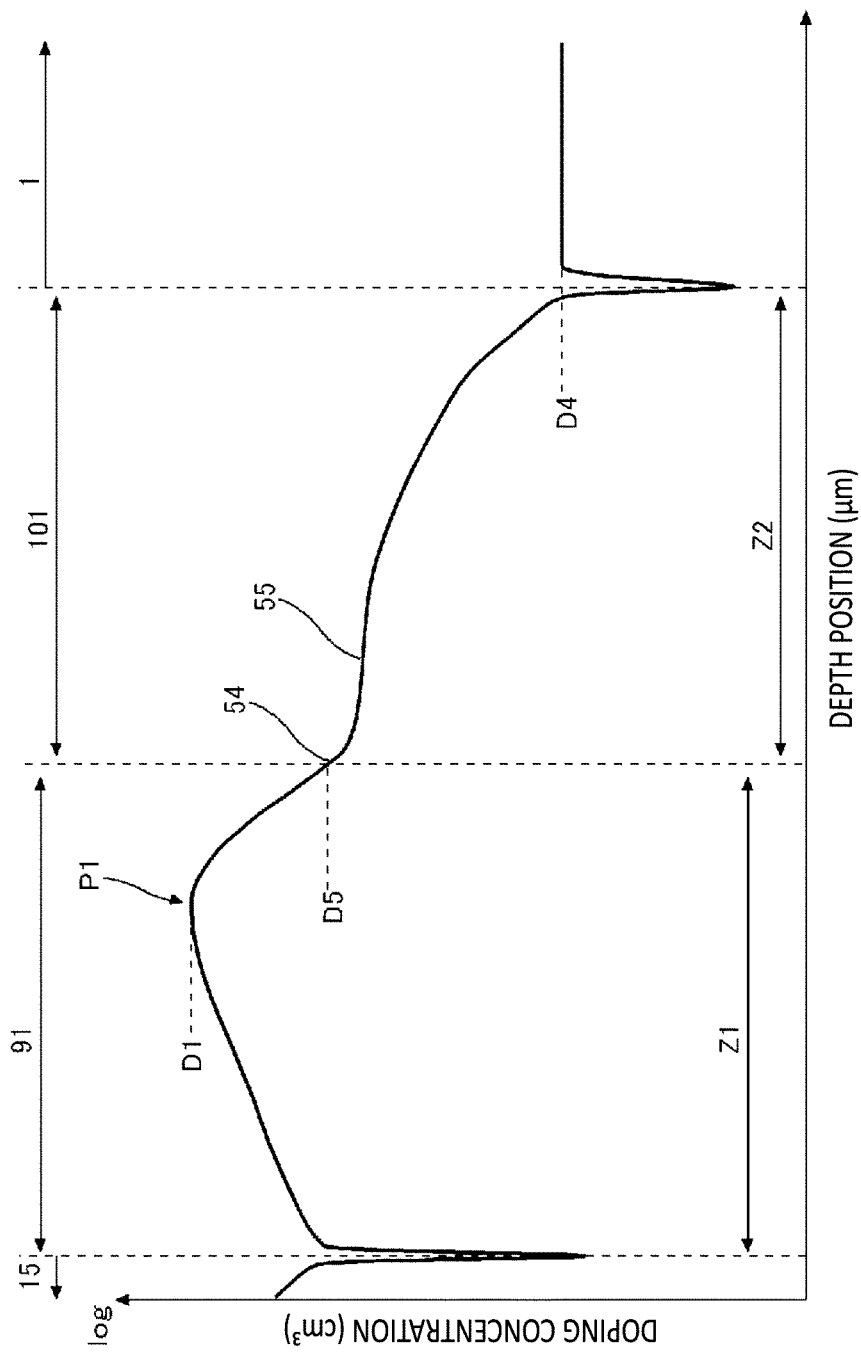
FIG. 5 is a diagram illustrating another example of the doping concentration distribution in the depth direction of the semiconductor substrate 50 taken along line A-A in FIG. 3.

FIG. 5 is a diagram illustrating another example of the doping concentration distribution in the depth direction of the semiconductor substrate 50 taken along line A-A in FIG. 3. The doping concentration distribution of this example is different from the example illustrated in FIG. 4 in that an inflection point 54 is provided instead of the valley portion 52 in the example of FIG. 4, and the first low-concentration region 101 does not have the concentration peak P2. Other structures are similar to the doping concentration distribution described in FIG. 4. When the dose amount of ions with respect to the first low-concentration region 101 is relatively small, it is conceivable that the concentration peak P2 does not clearly appear as illustrated in FIG. 5.

The inflection point 54 is a point at which the doping concentration distribution switches from an upwardly convex shape to a downwardly convex shape in a direction from the concentration peak P1 toward the bulk region 1. That is, the inflection point 54 is a point at which the sign of the value obtained by second-order differentiation of the doping concentration at the depth position changes from negative to positive in the direction from the concentration peak P1 toward the bulk region 1. An inflection point 55 may be disposed between the inflection point 54 and the bulk region 1. The inflection point 55 is a point at which the doping concentration distribution is switched from a downwardly convex shape to an upwardly convex shape in a direction from the inflection point 54 toward the bulk region 1. That is, the inflection point 55 is a point at which the sign of the value obtained by second-order differentiation of the doping concentration at the depth position changes from positive to negative in the direction from the inflection point 54 toward the bulk region 1.

In this example, a region from the lower end of the extending portion 15 (or the piezo-resistive region 11) to the inflection point 54 is referred to as the first well region 91. A region from the inflection point 54 to the bulk region 1 is referred to as the first low-concentration region 101. When a plurality of inflection points 54 are present in the doping concentration distribution from the extending portion 15 to the bulk region 1, the inflection point 54 closest to the extending portion 15 may be used as the boundary between the first well region 91 and the first low-concentration region 101. A region from the lower end of the extending portion 15 (or the piezo-resistive region 11) to the inflection point 55 may be the first well region 91. When a plurality of inflection points 55 are present in the doping concentration distribution from the extending portion 15 to the bulk region 1, the inflection point 55 closest to the extending portion 15 may be used as the boundary between the first well region 91 and the first low-concentration region 101.

The doping concentration in the first low-concentration region 101 monotonously decreases from the boundary with the first well region 91 (the inflection point 54 or the inflection point 55) to the bulk region 1. That is, no region where the doping concentration increases is present from the boundary to the bulk region 1. A doping concentration D5 at the boundary corresponds to the maximum value of the doping concentration in the first low-concentration region 101. The doping concentration D5 may be 2 times or more, 5 times or more, or 10 times or more the doping concentration D4.

The doping concentration D5 is lower than the doping concentration D1 of the concentration peak P1. The doping concentration D5 may be half or less, 1/5 or less, 1/10 or less, or 1/100 or less of the doping concentration D1. The doping concentration D1 may be $1\times10^{15}/cm^3$ or more and $1\times10^{17}/cm^3$ or less. The doping concentration D5 may be $1\times10^{13}/cm^3$ or more and $1\times10^{15}/cm^3$ or less.

In FIGS. 4 and 5, the doping concentration distribution of the first well region 91 and the first low-concentration region 101 has been described. The doping concentration distribution of the high-concentration resistance portion 12 and the portion of the piezo-resistive region 11 other than the high-concentration resistance portion 12 may also have a shape similar to the doping concentration distribution of the first well region 91 and the first low-concentration region 101. That is, the boundary between the high-concentration resistance portion 12 and the other portion may be a valley portion or may be an inflection point of the doping concentration distribution.

Figure 6:
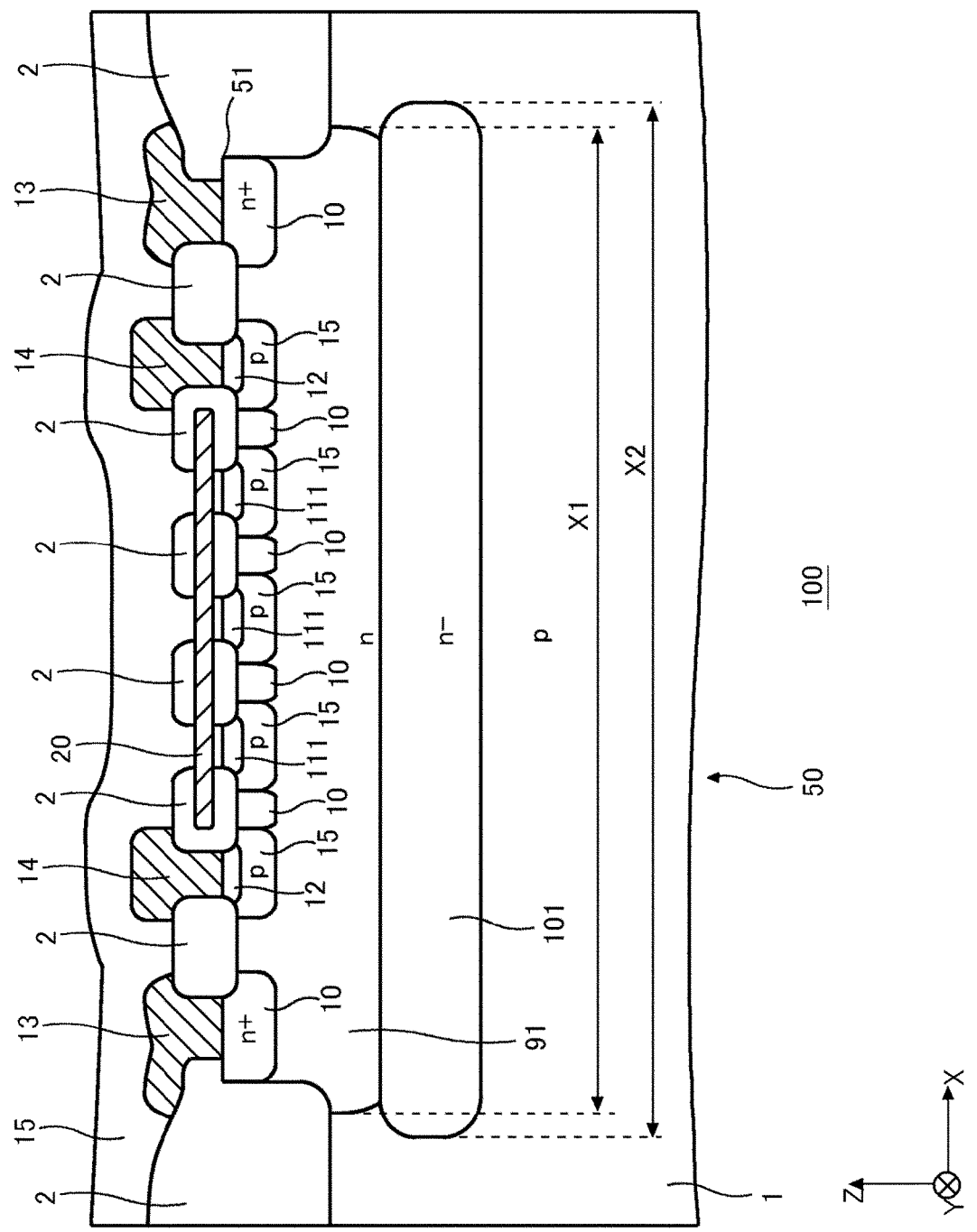
FIG. 6 is a diagram illustrating another structure example of the pressure detection unit 100.

FIG. 6 is a diagram illustrating another structure example of the pressure detection unit 100. The pressure detection unit 100 of this example is different from the example illustrated in FIG. 3 in that a width X2 of the first low-concentration region 101 in the X axis direction is larger than a width X1 of the first well region 91 in the X axis direction. Other structures are similar to those of any of the aspects described in FIGS. 3 to 5. By increasing the width X2, even when the position of the first low-concentration region 101 in the X axis direction is shifted, the lower end of the first well region 91 can be covered with the first low-concentration region 101.

Figure 7:
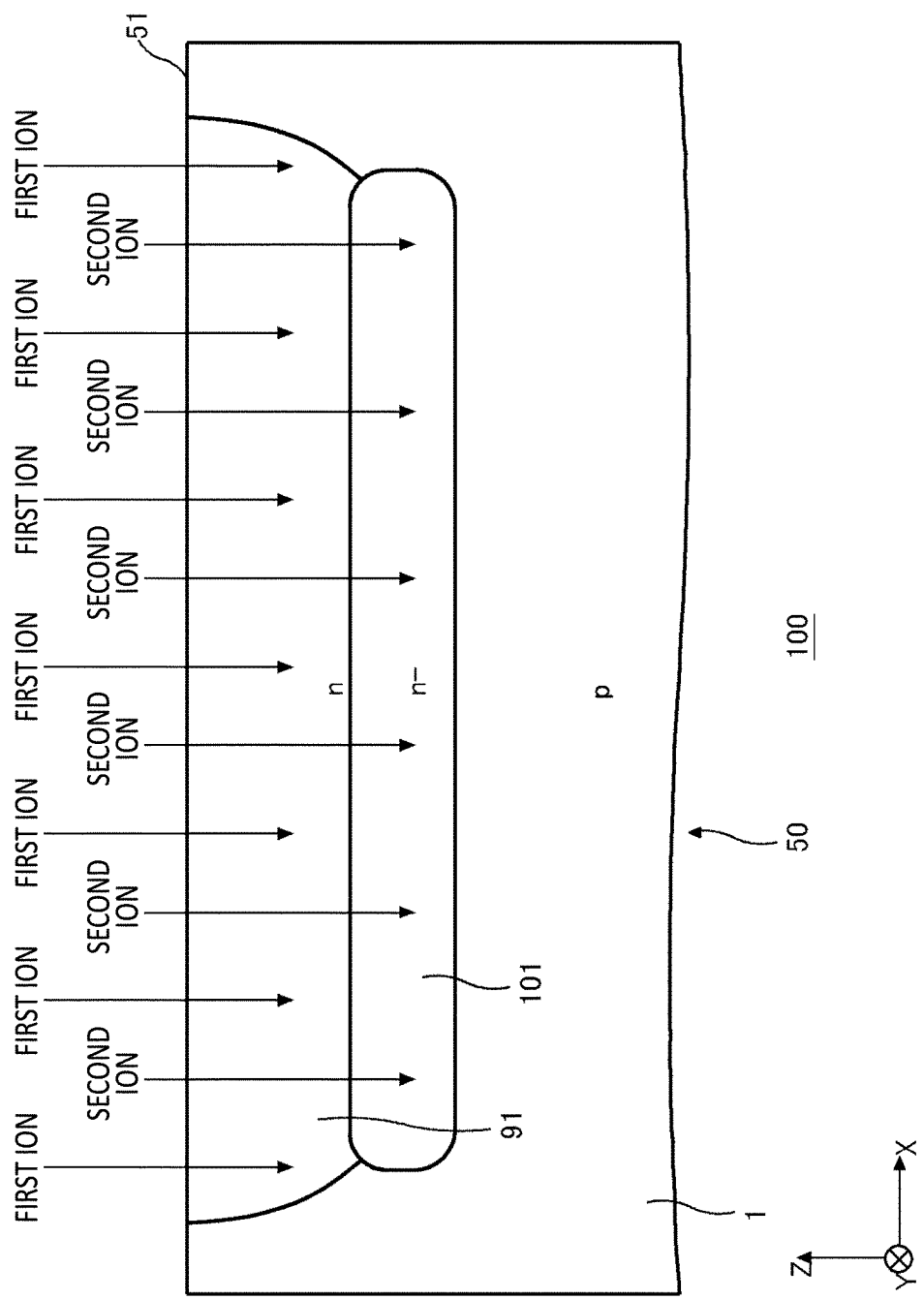
FIG. 7 is a diagram for explaining a manufacturing method of the pressure detection device 300.

FIG. 7 is a diagram for explaining a manufacturing method of the pressure detection device 300. FIG. 7 illustrates a step of forming the first well region 91 and the first low-concentration region 101 in a manufacturing step. In the manufacturing method, the first well region 91 and the first low-concentration region 101 are formed by separately implanting ions into each of the depth position where the first well region 91 is to be formed and the depth position where the first low-concentration region 101 is to be formed. In the example of FIG. 7, first ions are implanted to form the first well region 91, and second ions are implanted to form the first low-concentration region 101. The first ions and the second ions may be ions of the same element or ions of different elements.

The semiconductor substrate 50 may be heat-treated at each timing after the implantation of the first ions and after the implantation of the second ions. As a result, ions can be diffused, and ions can be activated to form an n-type region. The heat treatment may be performed by implanting the second ions and then implanting the first ions. In this case, since the thermal history for the second ions is increased, the diffusion distance of the second ions is increased, and the length of the first low-concentration region 101 in the Z axis direction is easily increased. In another example, the heat treatment may be performed after implanting the first ions and the second ions.

Figure 8:
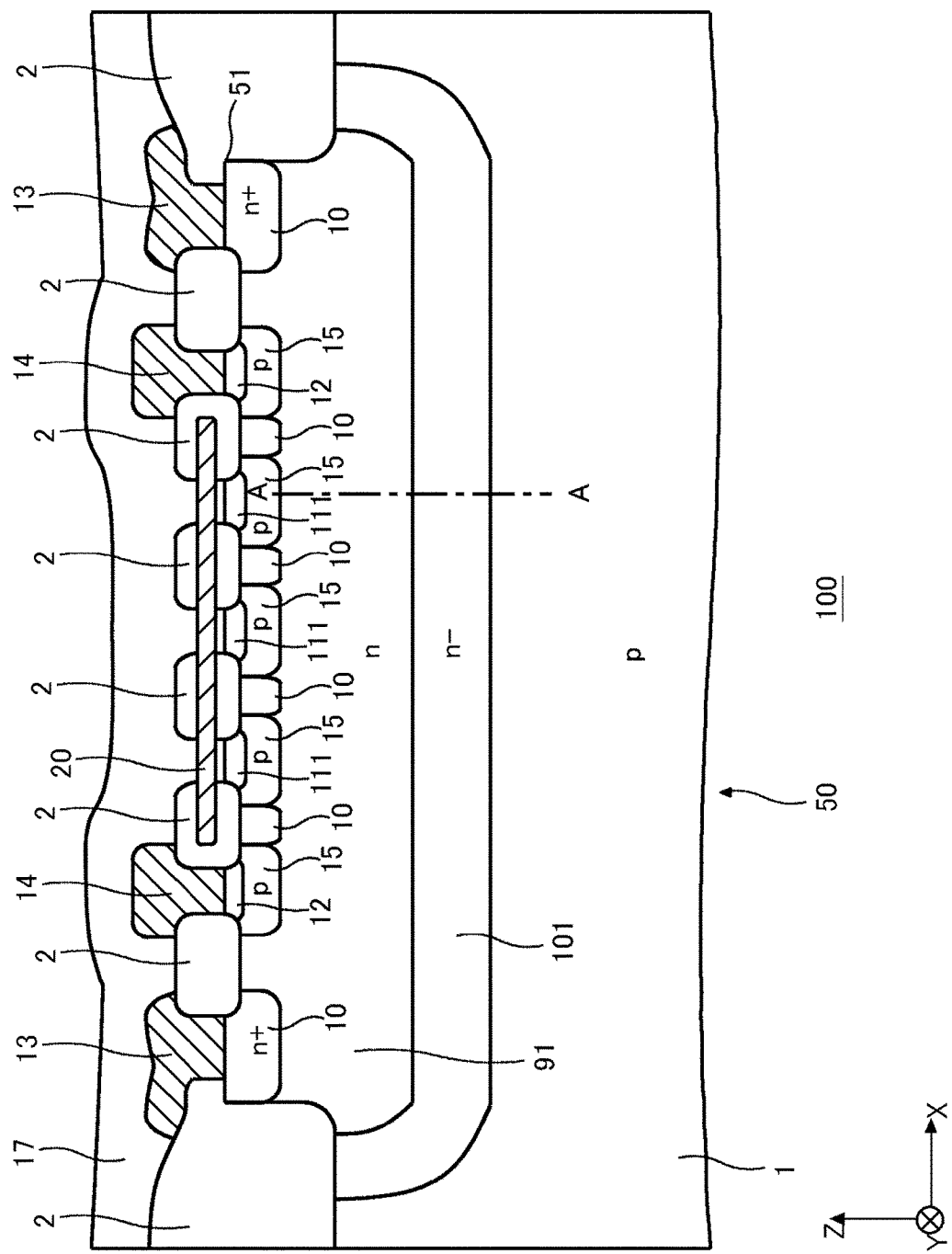
FIG. 8 is a diagram illustrating another structure example of the pressure detection unit 100.

FIG. 8 is a diagram illustrating another structure example of the pressure detection unit 100. The pressure detection unit 100 of this example is different from the example illustrated in FIG. 3 in that the first low-concentration region 101 is formed such that the first well region 91 is disposed therein. Other structures are similar to those of any of the aspects described in FIGS. 3 to Since the first low-concentration region 101 is provided all between the first well region 91 and the bulk region 1, the leakage current can be reduced as compared with the example illustrated in FIG. 3.

An example of the manufacturing method of the pressure detection unit 100 illustrated in FIG. 8 will be described. The steps of the first well region 91 and the first low-concentration region 101 in the manufacturing step will be described. In the manufacturing method of the pressure detection unit 100, ions are implanted into a region where the first low-concentration region 101 is to be formed, and are subjected to heat treatment and diffusion. Thereafter, ions are implanted into a region where the first well region 91 is to be formed, and are subjected to heat treatment and diffusion. The ions for forming the first low-concentration region 101 and the ions for forming the first well region 91 may be ions of the same element or ions of different elements. According to this method, the doping concentration distribution illustrated in FIG. 5 can be obtained.

Figure 9:
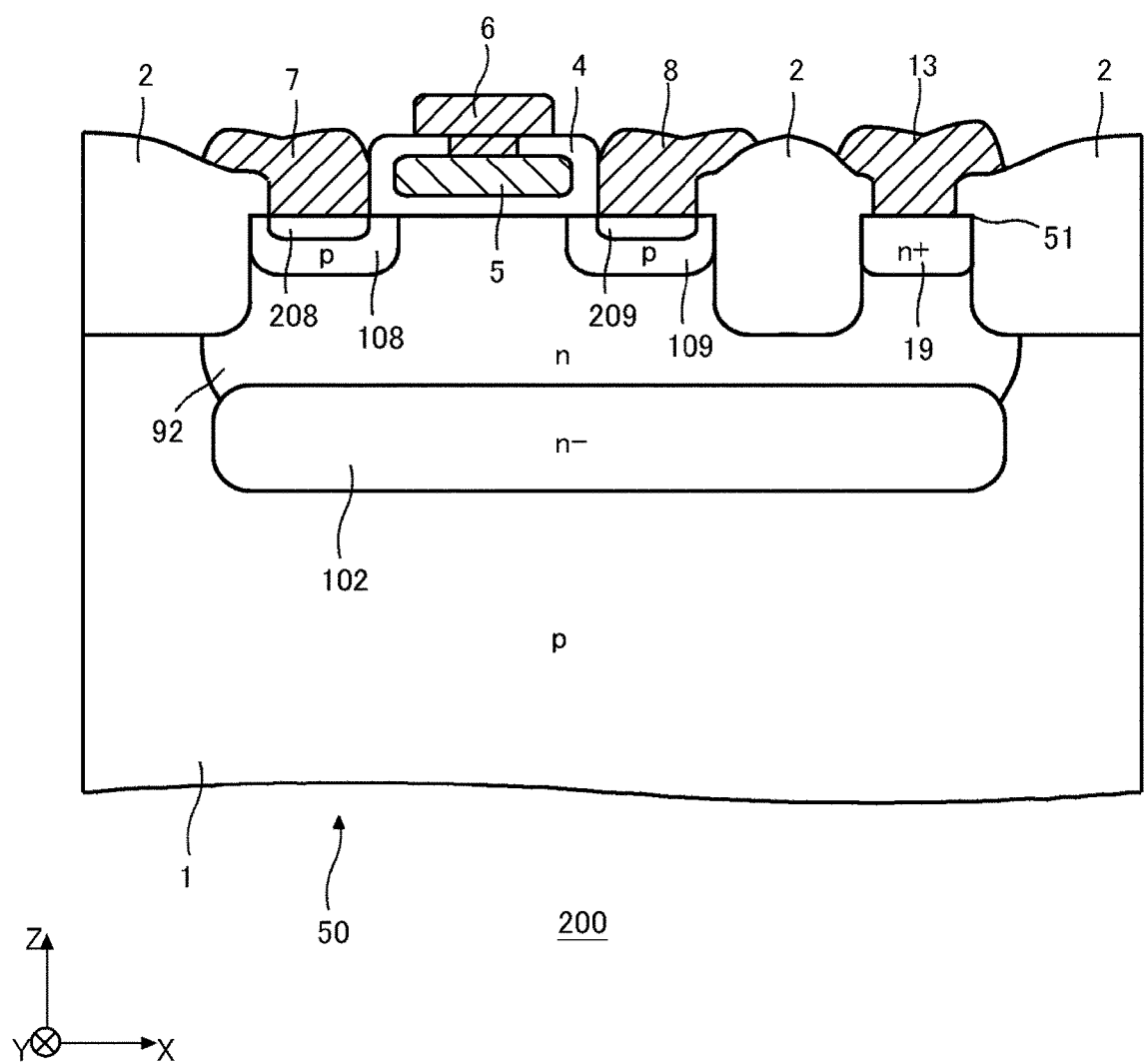
FIG. 9 is a diagram illustrating a structure example of a semiconductor element unit 200.

FIG. 9 is a diagram illustrating a structure example of the semiconductor element unit 200. FIG. 9 illustrates a cross section of the semiconductor substrate 50 in the vicinity of one PMOS transistors. Also in FIG. 9, the lower surface of the semiconductor substrate 50 is omitted.

The semiconductor substrate 50 has the p-type bulk region 1, a second well region 92, and a second low-concentration region 102. The second well region 92 is an n-type region provided between the upper surface 51 and the bulk region 1.

Each region of the PMOS transistor is formed inside the second well region 92. The structure of the PMOS transistor will be described later. The second low-concentration region 102 is provided between the second well region 92 and the bulk region 1. The second low-concentration region 102 is an n-type region having a lower concentration than the second well region 92. That is, the maximum value of the doping concentration in the second low-concentration region 102 is lower than the maximum value of the doping concentration in the second well region 92. The minimum value of the doping concentration in the second low-concentration region 102 may be lower or higher than the maximum value of the doping concentration in the second well region 92. The upper end of the second low-concentration region 102 of this example is in contact with the second well region 92, and the lower end is in contact with the bulk region 1. A pn junction is formed at an interface between the second low-concentration region 102 and the bulk region 1.

The doping concentration of the second well region 92 may be the same as or different from the doping concentration of the first well region 91. The doping concentration of the second low-concentration region 102 may be the same as or different from the doping concentration of the first low-concentration region 101. The doping concentration distribution of the second well region 92 and the second low-concentration region 102 in the depth direction may be similar to the doping concentration distribution described in FIG. 4 or FIG. 5.

By providing the second low-concentration region 102, the second low-concentration region 102 and the bulk region 1 are in contact with each other, and the impurity concentration in the pn junction portion can be lowered. As a result, a leakage current between the second low-concentration region 102 and the bulk region 1 can be suppressed. When the leakage current flows through the second well region 92, the operation of the PMOS transistor may be affected, but in this example, the PMOS transistor can be operated with high accuracy.

A p-type source region 108 and a p-type drain region 109 are provided inside the second well region 92. The doping concentration of the source region 108 and the drain region 109 may be higher than that of the bulk region 1. The source region 108 is connected to a source wiring 7, and the drain region 109 is connected to a drain wiring 8. The source wiring 7 and the drain wiring 8 are formed of a conductive material such as metal.

A gate electrode 5 formed of a conductive material such as polysilicon is provided above the upper surface 51 of the semiconductor substrate 50. The gate electrode 5 is disposed above the n-type region (the second well region 92 in this example) between the source region 108 and the drain region 109. When a predetermined gate voltage is applied to the gate electrode 5, a p-type channel inversion layer is formed on the surface layer of the n-type region, and a current flows between the source region 108 and the drain region 109. A gate dielectric film 4 is provided between the gate electrode 5 and the semiconductor substrate 50. The gate electrode 5 is connected to a gate wiring 6 formed of a conductive material such as metal.

An n-type region 19 may be disposed inside the second well region 92. The n-type region 19 is a region having a higher concentration than the second well region 92. The n-type region 19 is connected to the power supply wiring 13, and the predetermined power supply voltage Vdd is applied thereto. As a result, the potential of the second well region 92 can be set to the power supply voltage Vdd.

The source region 108 may have a p-type high-concentration source portion 208 in contact with the upper surface 51, and a p-type low-concentration source portion provided between the high-concentration source portion 208 and the second well region 92 and having a lower concentration than the high-concentration source portion 208. In the example of FIG. 9, the source region 108 other than the high-concentration source portion 208 correspond to the low-concentration source portion. With such a configuration, the impurity concentration in the pn junction between the source region 108 and the second well region 92 can be lowered to suppress the leakage current. The doping concentration distribution of the high-concentration source portion 208 and the source region 108 other than the high-concentration source portion 208 may also have a shape similar to the doping concentration distribution of the first well region 91 and the first low-concentration region 101. That is, the boundary between the high-concentration source portion 208 and the other source region 108 may be a valley portion or may be an inflection point of the doping concentration distribution.

The drain region 109 may have a p-type high-concentration drain portion 209 in contact with the upper surface 51, and a p-type low-concentration drain portion provided between the high-concentration drain portion 209 and the second well region 92 and having a lower concentration than the high-concentration drain portion 209. In the example of FIG. 9, the drain region 109 other than the high-concentration drain portion 209 corresponds to the low-concentration drain portion. With such a configuration, the impurity concentration in the pn junction between the drain region 109 and the second well region 92 can be lowered to suppress the leakage current. The doping concentration distribution of the high-concentration drain portion 209 and the drain region 109 other than the high-concentration drain portion 209 may also have a shape similar to the doping concentration distribution of the first well region 91 and the first low-concentration region 101. That is, the boundary between the high-concentration drain portion 209 and the other drain region 109 may be a valley portion or may be an inflection point of the doping concentration distribution.

While the embodiment of the present invention has been described, the technical scope of the invention is not limited to the above-described embodiment. It is apparent to persons skilled in the art that various alterations or improvements can be added to the above-described embodiments. It is also apparent from the scope of the claims that the embodiments added with such alterations or improvements can be included in the technical scope of the invention.

What is claimed is:

1. A pressure detection device comprising:
    a semiconductor substrate having an upper surface;
    a bulk region of a first conductivity type provided in the semiconductor substrate;
    a piezo-resistive region of the first conductivity type provided between the bulk region and the upper surface of the semiconductor substrate;
    a first well region of a second conductivity type provided between the piezo-resistive region and the bulk region; and
    a first low-concentration region of the second conductivity type provided between the first well region and the bulk region and having a lower concentration than the first well region.

2. The pressure detection device according to claim 1, wherein
the first well region and the first low-concentration region each have a concentration peak in a doping concentration distribution in a depth direction of the semiconductor substrate.

3. The pressure detection device according to claim 1, wherein
a doping concentration distribution in a depth direction of the semiconductor substrate has:
a concentration peak disposed in the first well region; and
an inflection point disposed between the concentration peak and the bulk region, and
the first low-concentration region is a region between the inflection point and the bulk region.

4. The pressure detection device according to claim 1, wherein
a maximum value of a doping concentration in the first well region is $1\times10^{15}/cm^3$ or more and $1\times10^{17}/cm^3$ or less, and
a maximum value of the doping concentration in the first low-concentration region is $1\times10^{13}/cm^3$ or more and $1\times10^{15}/cm^3$ or less.

5. The pressure detection device according to claim 1, wherein
a length of the first low-concentration region in a depth direction of the semiconductor substrate is larger than a length of the first well region in the depth direction.

6. The pressure detection device according to claim 1, wherein
a width of the first low-concentration region is larger than a width of the first well region in a direction perpendicular to a depth direction of the semiconductor substrate.

7. The pressure detection device according to claim 2, wherein
a depletion layer extending from a pn junction between the first low-concentration region and the bulk region does not reach the concentration peak of the first well region in a state where a rated voltage is applied to the semiconductor substrate.

8. The pressure detection device according to claim 1, further comprising:
a source region and a drain region of the first conductivity type provided between the bulk region and the upper surface of the semiconductor substrate;
a second well region of the second conductivity type provided between the source region and the drain region, and the bulk region; and
a second low-concentration region of the second conductivity type provided between the second well region and the bulk region and having a lower concentration than the second well region.

9. The pressure detection device according to claim 1, wherein
the piezo-resistive region has a plurality of extending portions having a longitudinal length in a first direction on the upper surface of the semiconductor substrate,
the pressure detection device has one or more separation regions of the second conductivity type which are provided between the extending portions and has a higher concentration than the bulk region, and
each of the separation regions is in contact with two adjacent extending portions.

10. The pressure detection device according to claim 1, wherein the piezo-resistive region has:
a high-concentration resistance portion of a first conductivity type in contact with the upper surface of the semiconductor substrate; and
a low-concentration resistance portion of the first conductivity type which is provided between the high-concentration resistance portion and the first well region and has a lower concentration than the high-concentration resistance portion.

11. The pressure detection device according to claim 8, wherein
the source region has:
a high-concentration source portion of the first conductivity type in contact with the upper surface of the semiconductor substrate; and
a low-concentration source portion of the first conductivity type which is provided between the high-concentration source portion and the second well region and has a lower concentration than the high-concentration source portion, and
the drain region has:
a high-concentration drain portion of the first conductivity type in contact with the upper surface of the semiconductor substrate; and
a low-concentration drain portion of the first conductivity type which is provided between the high-concentration drain portion and the second well region and has a lower concentration than the high-concentration drain portion.

12. The pressure detection device according to claim 1, further comprising
a conductive shield film which is disposed above the upper surface of the semiconductor substrate and configured to cover at least a part of the piezo-resistive region.

13. A manufacturing method of a pressure detection device, wherein
the pressure detection device includes:
a semiconductor substrate having an upper surface and a lower surface;
a bulk region of a first conductivity type provided in the semiconductor substrate;
a piezo-resistive region of the first conductivity type provided between the bulk region and the upper surface of the semiconductor substrate;
a first well region of a second conductivity type provided between the piezo-resistive region and the bulk region; and
a first low-concentration region of the second conductivity type provided between the first well region and the bulk region and having a lower concentration than the first well region, and
the first well region and the first low-concentration region are formed by separately implanting ions into each of a position where the first well region is to be formed and a position where the first low-concentration region is to be formed.

14. The pressure detection device according to claim 2, wherein
a maximum value of a doping concentration in the first well region is $1\times10^{15}/cm^3$ or more and $1\times10^{17}/cm^3$ or less, and
a maximum value of the doping concentration in the first low-concentration region is $1\times10^{13}/cm^3$ or more and $1\times10^{15}/cm^3$ or less.

15. The pressure detection device according to claim 3, wherein a maximum value of a doping concentration in the first well region is $1\times10^{15}/cm^3$ or more and $1\times10^{17}/cm^3$ or less, and a maximum value of the doping concentration in the first low-concentration region is $1\times10^{13}/cm^3$ or more and $1\times10^{15}/cm^3$ or less.

16. The pressure detection device according to claim 2, wherein a length of the first low-concentration region in a depth direction of the semiconductor substrate is larger than a length of the first well region in the depth direction.

17. The pressure detection device according to claim 3, wherein a length of the first low-concentration region in a depth direction of the semiconductor substrate is larger than a length of the first well region in the depth direction.

18. The pressure detection device according to claim 2, wherein a width of the first low-concentration region is larger than a width of the first well region in a direction perpendicular to a depth direction of the semiconductor substrate.

19. The pressure detection device according to claim 3, wherein a width of the first low-concentration region is larger than a width of the first well region in a direction perpendicular to a depth direction of the semiconductor substrate.

20. The pressure detection device according to claim 3, wherein a depletion layer extending from a pn junction between the first low-concentration region and the bulk region does not reach the concentration peak of the first well region in a state where a rated voltage is applied to the semiconductor substrate.

\* \* \* \* \*